United States Patent [19]
Rudi

[11] Patent Number: 5,452,152
[45] Date of Patent: Sep. 19, 1995

[54] TRACKING CONTROL ON LONGITUDINAL AZIMUTH TRACKS USING AN AUXILIARY READ HEAD

[75] Inventor: Guttorm Rudi, Fjellhamar, Norway

[73] Assignee: Tandberg Data A/S, Oslo, Norway

[21] Appl. No.: 711,087

[22] Filed: Jun. 6, 1991

[30] Foreign Application Priority Data

Aug. 28, 1990 [DE] Germany .................. 40 27 194.3

[51] Int. Cl.⁶ ........................................... G11B 5/584
[52] U.S. Cl. ........................... 360/77.12; 360/78.02
[58] Field of Search ................... 360/78.02, 77.12

[56] References Cited

U.S. PATENT DOCUMENTS

| | | | |
|---|---|---|---|
| 4,422,112 | 12/1983 | Tanaka | 360/77.12 |
| 4,866,548 | 9/1989 | Rudi | 360/77.02 |
| 5,132,861 | 7/1992 | Behr et al. | 360/121 |
| 5,257,148 | 10/1993 | Solhjell et al. | 360/77.12 X |

FOREIGN PATENT DOCUMENTS

| | | |
|---|---|---|
| 0032660 | 7/1981 | European Pat. Off. |
| 45-35155 | 11/1970 | Japan ................. 360/77.12 |
| 59-185020 | 10/1984 | Japan . |
| 59-231731 | 12/1984 | Japan . |
| 58189877 | 11/1985 | Japan . |

*Primary Examiner*—Aristotelis Psitos
*Assistant Examiner*—James T. Wilson
*Attorney, Agent, or Firm*—Hill, Steadman & Simpson

[57] ABSTRACT

To position a magnetic head of a magnetic coding storage device relative to different tracks of a recording medium, a different and previously recorded track is used as the reference track in each case. The magnetic head contains an auxiliary read head which, with respect to the write head, is disposed at a predetermined distance at right angles to the direction of movement of the recording medium and follows the reference track during the movement of the recording medium. A control circuit in a control unit ensures that the auxiliary read head follows this track as accurately as possible. The reference track is a track whose changes in magnetization are recorded with different azimuth angles as instantaneously recorded adjacent tracks.

13 Claims, 4 Drawing Sheets

TRACKING CONTROL ON LONGITUDINAL AZIMUTH TRACKS USING AN AUXILIARY READ HEAD

BACKGROUND OF THE INVENTION

1. Field of the Invention

The invention relates to a method of positioning a combined magnetic read and write head in a magnetic coding storage device. The invention also relates to a system for performing this method.

2. Description of the Prior Art

Methods of positioning magnetic head in magnetic coding storage devices, more particularly magnetic tape devices, are known in the art.

A method of this kind for the accurate positioning of a magnetic head of a magnetic coding storage device is described in EP-A1-0 276 451. In this known method, a stepping motor is used to move the magnetic head at right angles to the direction of movement of the recording medium, which is a magnetic tape. To control the stepping motor a correction value which corresponds to the offset between a write head and a read head of the magnetic tape along one track of the recording medium is added to a position value associated with each track of the recording support. Using this known method it is possible to achieve an accurate positioning particularly if the write and read head or in the magnetic head are not accurately aligned along one track, or if the magnetic head itself has not been accurately adjusted.

In the recording of data signals on a recording medium, the number of tracks is very important to the storage density. It is therefore very important to accommodate the largest number of tracks on a medium, e.g. a magnetic tape. A high track density, however, can be achieved only if there is high accuracy of positioning.

For this purpose, it is known from JP-A-59 185 020 to adjust the position of a multi-channel magnetic head with respect to a magnetic tape by providing, in addition of the write/read heads for the individual recording tracks, other write/read heads for recording or reading reference tracks. Pairs of write and read heads for recording and reading edge tracks are provided in each case opposite the two tape edges. A write/read head is disposed in the center of the multi-channel magnetic head for recording a center reference track.

For recording, the multi-channel magnetic head is first roughly positioned. The edge heads are used in each case to record and then read an auxiliary track at the edges of a magnetic tape. The off-position of the magnetic head can be corrected by shifting the magnetic head transversely to the direction of the track until the read signals of both edge tracks have the same amplitude. The multi-channel magnetic head is then accurately positioned with respect to the magnetic tape. During the information recording, the central reference track is recorded at the same time. On subsequent reading of the magnetic tape the magnetic head is aligned and kept aligned exactly on the center of the central reference track and hence to the tape center by means of the centrally disposed auxiliary read head, which is divided in half. This known system is relatively complex and can also be used rationally only in multi-track heads. It also has the disadvantage that tolerance build-ups which occur precisely with multi-track heads are harmless only if recorded magnetic tapes are again read with the same magnetic head which was used to record the tape.

A similar solution is also disclosed in JP-A-59 231 731 in which an auxiliary write head is used to record a reference track near the tape edge. The reference track being evaluated by a two-part auxiliary read head in order to position a read head system.

During normal tape transport, of course, additional tape movements occur vertically to the direction of tape transport. This is known as tape wander. A positioning device for a multi-track head is disclosed in JP-A-58 189 877 for countering this disturbing effect. In this magnetic head, a centrally disposed auxiliary write head is again used to record a reference track, which is read during reading by means of a two-part read head. The read signals are evaluated to derive a positioning signal with which the multi-track head is continuously kept at the center of the reference track despite the tape wander.

Finally, EP-A 1-32 660 discloses a track following control for a multi-track head, two auxiliary read heads being provided. These two heads are disposed laterally on the multi-track head at an angle to the direction of tape transport at opposite edges of the tape. These auxiliary read heads detect edge tracks recorded with the multi-track head. The flux changes recorded in the information tracks by the multi-track head are aligned vertically to the longitudinal direction of the magnetic tape. If the multi-track head is not aligned exactly to the center of the magnetic tape during reading, the auxiliary read head gaps pass over these vertical flux changes in the edge tracks at somewhat different times. Thus the phase difference in the read signals of the auxiliary read heads is an index of the offset of the multi-track head from the tape center. By means of feedback control for the vertical position of the multi-track head, the attempt is made to cancel out this phase difference. The disadvantage of this known solution is that the angles of incidence of the auxiliary read heads must be made large enough to allow good resolution for positioning control. This is usually not possible, however, because as the angles of incidence of the auxiliary read heads increase so their read signal amplitudes continue to decrease.

SUMMARY OF THE INVENTION

An object of the present invention is to provide a method and a system for performing the method for very accurate positioning of a combined magnetic head with respect to the individual tracks of the recording support.

The above object is achieved in accordance with the principles of the present invention in a method and apparatus wherein a different and previously recorded track on the recording medium is used as a reference track for positioning a magnetic read and write head relative to different tracks on the recording medium. The magnetic head containing the read and write heads also contains an auxiliary read head which is disposed, with respect to the write head, at a predetermined distance at right angles to the direction of movement of the recording medium.

An advantage of the method according to the invention is that the magnetic head can be positioned relative to tracks already recorded and this positioning is largely independent of any inaccuracies during the movement of the recording support. The track spacing corresponds to the spacing between an auxiliary read head— more particularly one scanning an edge of a reference track—and a write head and/or read head. This spacing is predetermined by the construction of the combined magnetic head and can be made very small.

A track associated with an edge or with the center of the recording support can be used as the reference track.

The magnetic head may have an auxiliary read head which scans both edges of the reference track by means of divided air gaps.

A system for performing the method includes a combined magnetic head which, in addition to at least one write head and/or read head, has at least one auxiliary read head and a control unit which controls the magnetic head so that the auxiliary read head follows each reference track as accurately as possible.

The width of the auxiliary read head is much less than that of the write head or read head, and preferably an edge of the reference track is scanned by the auxiliary read head. If auxiliary read heads are used with two air gaps, they can each scan one of the two edges of the reference track. In a multi-track head the auxiliary read heads may also be associated with different tracks.

It is particularly advantageous to use a magnetic head with more than one read and write head and to have different azimuth angles for the air gaps of the read and write heads. This allows information recording with changes of magnetization at different azimuth angles in adjacent tracks. This type of magnetic recording enables an auxiliary read head to generate read signals which have substantially no interference from adjacent tracks.

This applies even if recording tracks are disposed in immediately contiguous relationship without any unrecorded areas, i.e., protective strips, and even if the auxiliary read head is incorrectly positioned and partially overlapped by the recording track adjacent the reference track. Without making positioning difficult, this solution allows an appreciable increase in track density on the recording support. Moreover, it is not absolutely necessary to have previously recorded servo tracks, so that the entire area of the recording support is optimally useable for data storage.

In addition, this procedure is insensitive to vertical movements of the recording support in the prior art positioning and recording methods in magnetic tape storage devices with further increasing track density such vertical movements become increasingly more critical since this wandering of the recording support may already achieve the order of magnitude of the track pitch. The present solution is therefore particularly advantageous to the manufacturer since in this way feed tolerances are less critical, and this in turn reduces production complexity and also manufacturing costs.

For small magnetic coating storage devices the electrical power consumption is also a considerable factor. It can be experimentally proved that the solution proposed here is fully satisfactory in this connection as well. The aforementioned vertical tape movements have a relatively high repetition frequency when tape is moving in a predetermined direction. Consequently, vertical corrections during the scanning of a reference track are small as soon as the auxiliary read head is positioned above its reference track, which is preferably recorded without track-following control if it is the first recording track, which is recorded with the recording support moving in the corresponding direction of transport.

DESCRIPTION OF THE PREFERRED EMBODIMENTS

Figure 1:
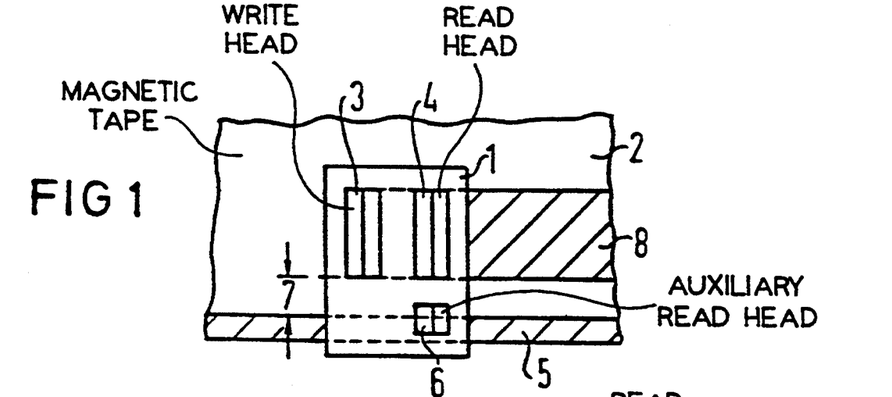
FIG. 1 shows a recording of signals on a recording medium using an edge track as reference track for a combined magnetic head, in accordance with the principles of the present invention.

Referring to FIG. 1, a combined magnetic head 1 is used to record signals, for example, data signals on a recording medium, more particularly a magnetic tape 2, and reproduce such signals. Recording is done by a write head 3, while playback is provided by a read head 4. In this example, the air gaps of these sub-heads are all aligned vertically to the longitudinal direction of the magnetic tape 2.

For writing or reading data, the edge of the magnetic tape 2 is first detected. This can be done, for example, as described in detail in U.S. Pat. No. 4,476,503.

For this purpose, the combined magnetic head 1 is moved in a direction at right angles to the direction of movement of the magnetic tape 2 until the write head 3 is no longer over the magnetic tape 2. The magnetic head 1 is then moved in the opposite direction, and write signals are fed to it at the same time. No signals are recorded on the magnetic tape 2 while the write head 3 is still out of contact therewith, and the read head 4 does not produce any reproduce signals. However, as soon as the write head 3 is situated over the magnetic tape 2, an edge track 5 is recorded on the magnetic tape 2. At the same time, the read head 4 reads signals from the magnetic tape 2. Depending upon a threshold value derived from a corresponding width of said edge track 5, a control unit connected to the read head 4 recognizes the edge of the magnetic tape 2. If the magnetic head 1 is held fast in this position at right angles to the direction of movement of the magnetic tape 2 and then moved in its longitudinal direction, an edge track 5 of this type can be recorded along the entire magnetic tape 2.

After the edge track 5 has been recorded the data signals are recorded. For this purpose, the magnetic head 1 is moved at right angles to the direction of movement of the magnetic tape 2 until a control unit, which may be identical to the above-mentioned control unit, recognizes the edge of the track 5 remote from the edge of the magnetic tape 2 by means of an auxiliary read head 6 provided in the magnetic head 1. For this purpose, the width of the auxiliary read head 6 transversely of the magnetic tape 2 is, preferably, much smaller than the width of the write head 3 and/or of the read head 4. Recognition of the edge track 5 can be effected in similar manner to recognition of the edge of the magnetic tape 2, i.e., by the signals reproduced by the auxiliary read head 6 exceeding or falling below a threshold value. On the subsequent recording of the data signals the control unit then controls the magnetic head 1, so that the auxiliary read head 6 always follows the edge of the edge track 5 as a reference track when the magnetic tape 2 is moved in its longitudinal direction. For this purpose, the magnetic head 2 is controlled at right angles to the direction of movement of the magnetic tape 1 by means of a control circuit provided in the control unit. Another auxiliary read head may be disposed above the read head 4 so that data can also be scanned at a predetermined distance from a reference track disposed above the read head 4.

In this embodiment, there is a preset vertical distance 7 between the auxiliary read head 6 and the write head 3 or the read head 4, such distance being measured, for example, from the center of the auxiliary read head G to the bottom edge of the write head 3 (or of the write head 4) and being equal, for example, to twice the width of the auxiliary read head 6. When the auxiliary read head 6 is following the edge of the reference track 5, then, upon the recording of the data signals a new track 8 is generated which has the distance 7 from the reference track 5. The distance 7 is kept as small as possible to achieve a high track density on the magnetic tape 2, while nevertheless avoiding signal interference between adjacent tracks.

When the data signals recorded on the magnetic tape 2 are reproduced, the magnetic head 2 can be controlled in the same way as during recording of the data signals, so that the read head 4 again always follows the reference track 5 at the distance 7. This ensures that the read head 4 is always exactly associated with the center of the track 8 containing the recorded data signals.

Instead of the edge track 5, another track previously recorded on the magnetic tape 2 may be used as reference track to record data signals on another track or read the same from this track. In this case, as well, a high track density is ensured, since again the write head 3 or the read head 4 always follow the reference track at the distance 7.

Figure 2:
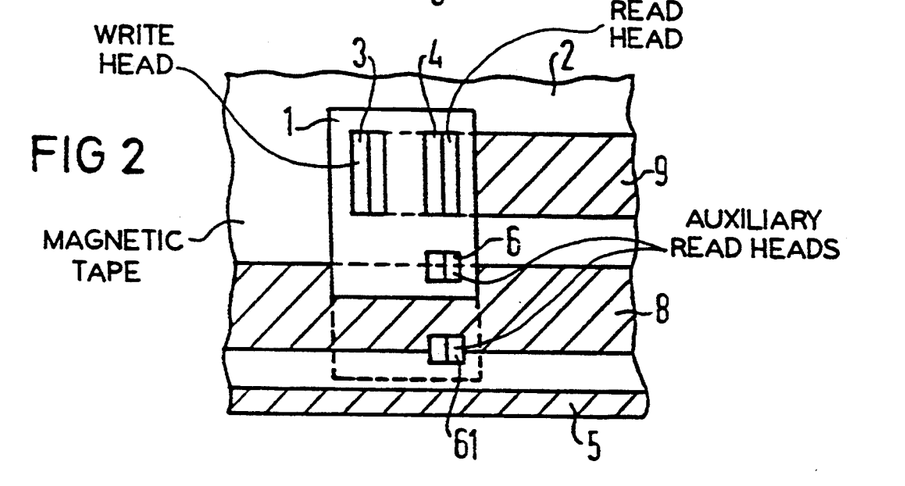
FIG. 2 shows a recording of signals in the recording support using a track formed from recorded data signals as the reference track for the magnetic head in accordance with the principles of the present invention.

In the recording of other tracks, as shown in FIG. 2, another (previously recorded) track is in each case used as the reference track. For example, the previously recorded track 8 is used as the new reference track for recording a new track 9 at distance 7 in the same way as indicated above.

FIG. 2 also shown in broken lines that the combined magnetic head 1 can also contain another auxiliary read head 61 which scans the other edge of a previously recorded track 8. Scanning of the other edge is effected by means of the auxiliary read head 61 in the same way as by means of the auxiliary read head 6. In this case the control unit uses the reproduced signals of these two auxiliary read heads 6 and 61 to ensure that the write head 3 and the read head 4 always have a preset distance from the center of the track 8.

If the magnetic tape device is not equipped with a control unit for detecting the edge of the magnetic tape 2, the first track can in known manner be recorded without using a reference track 5. In that case, the auxiliary read head 6 follows the edge of the already recorded track when recording a second track.

Instead of the edge or edges, it is also possible to scan the entire reference track 5 (or 8). The center of this reference track 5 (or 8) is then obtained from the maximal value of the read signals. This center is then used instead of the edge as a reference value for recording a track with the data signals.

Figure 3:
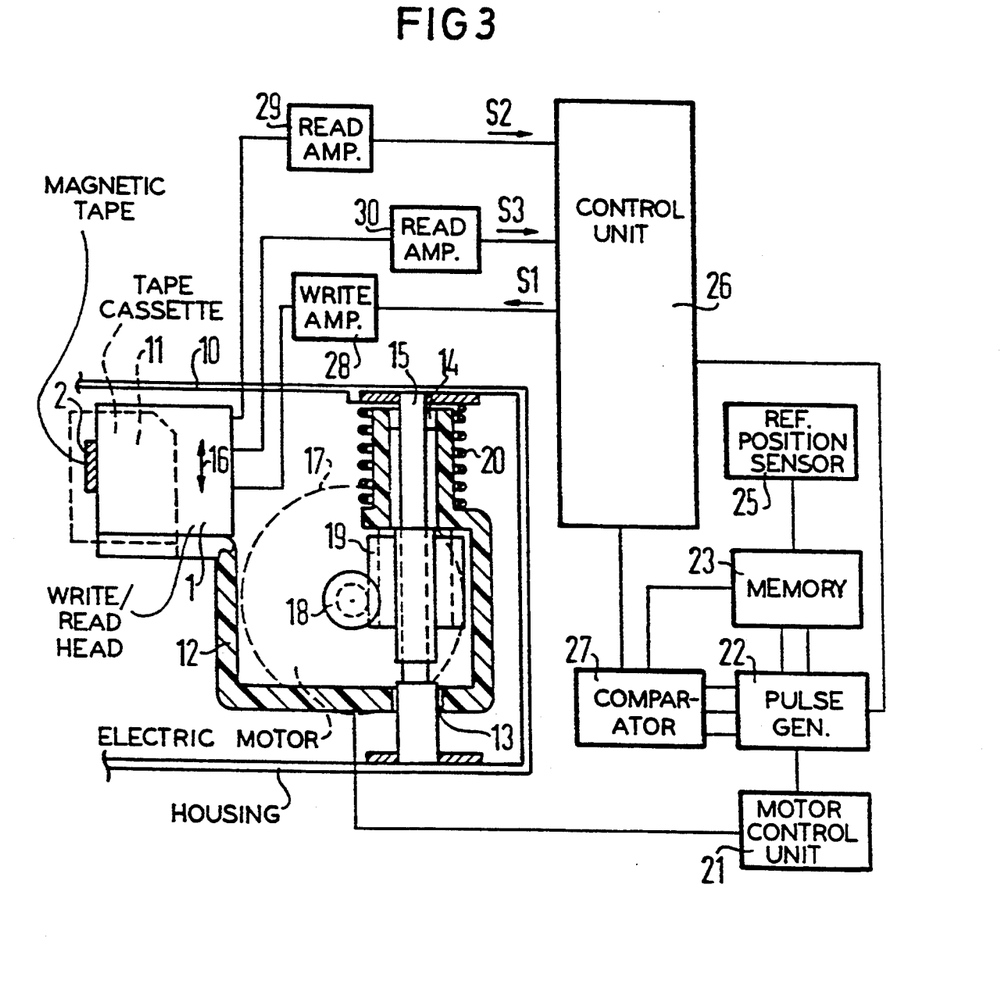
FIG. 3 is a block schematic diagram of a preferred embodiment of a system for performing the method in accordance with the principles of the present invention.

The arrangement shown in FIG. 3 for performing the method is a detail of a magnetic tape device constructed, for example, as a cassette magnetic tape device. A magnetic tape device of this kind is disclosed, for example, in U.S. Pat. No. 4,609,959 or 4,622,606. The housing 10 of the magnetic tape device contains a drive system (not shown) for the magnetic tape 2 acting as recording support, and a positioning means for the magnetic head 1. A tape cassette 11, shown in broken lines and containing the magnetic tape 2, can be inserted in the device. During operation of the device the magnetic head 1 engages an opening (not shown) in the cassette 11 in order to come into contact with the magnetic tape 2. The magnetic head 1 is fixed on a head carrier 12 which, for positioning of the magnetic head 1, can be moved jointly with the magnetic head 1 by means of two bearings 13 and 14 along an axis 15 in the transverse direction of the magnetic tape 2, as shown by the double arrow 16.

The movement of the head carrier 12 containing the magnetic head 1 is obtained by means of an electric motor 17, which is preferably in the form of a stepping motor although it can be constructed as a D.C. motor. A worm 18 is fixed on the shaft of the motor 17 and meshes with a wormwheel 19. In the region of the wormwheel 19 the shaft 15 has an external screwthread cooperating with an internal screwthread of the wormwheel 19. When the worm 18 is driven by the electric motor 17, it drives the wormwheel 19 and thus the latter moves axially along the axis 15. A compression spring 20 presses the head carrier 12 against the wormwheel 19 so that the carrier 12 follows the movement of the wormwheel 19 axially and thus positions the magnetic head 1 to different tracks of the magnetic tape 2. During movement of the head carrier 12 in the axial direction, the head carrier is prevented from being able to rotate with the rotation of the wormwheel 19. During insertion or removal of the cassette 11 the magnetic head 1 together with the head carrier 12 is pivotable out of the operative position into a position of rest.

The motor 17 receives control signals from a motor control unit 21, such signals being, for example, in the form of stepping pulses if the motor 17 is a stepping motor. The motor control unit 15 is triggered by a pulse transmitter 22 which, when a write head or a read head is positioned to a specific track of the magnetic tape 2, receives control signals for passing from an actual position, e.g., a specific track, to a required position, e.g., another track. A positioning means of this kind is known and is disclosed, for example, in U.S. Pat. No. 4,313,141.

A specific track to which a write head or read head is to be positioned is identified by a central control unit of the magnetic tape device or a control unit 26 constructed as a microcomputer. The actual position in which the magnetic head 1 is situated at any time is stored in a memory 23 or may also be stored in the microcomputer 26.

At the start of the operation of the magnetic tape device, the magnetic head 1 is brought to a reference position determined by a reference position sensor 25. This reference position is, for example, an edge of the magnetic tape 2 detected by the method described in the above-mentioned U.S. Pat. No. 4,476,503. The reference position may also be a first, e.g., outer or middle, track of the magnetic tape 2. Alternatively, as described in U.S. Pat. No. 4,313,141, the reference position may be a specific position of the positioning means detected by a photoelectric cell system. This reference position is then the actual-position upon starting, and is stored in the memory 23.

The microcomputer 26 contains an allocator which contains the required-position value of each track according to its associated track number. Both the required-position value delivered by the allocator and the actual-position value delivered by the memory 25 are fed to a comparator 27 which, from the difference between the required-position value and the actual-position value, determines the distance, both in magnitude and direction, and causes the pulse generator 22 to deliver pulses for the stepping motor 17 to the motor control unit until the required-position value agrees with the actual-position value. Thus the magnetic head 1 is positioned to the required track using the motor 17. At the same time, the pulses are fed to the memory 23 so that the memory 23 contains the new actual-position. For this purpose the memory 23 may contain an adder which subtracts from or adds to the old actual-position the corresponding number of pulses at any time. Alternatively, a counter may be used, the counter state indicating the actual-position at any time and counting up or down in each case as a result of the pulses delivered by the pulse generator 22.

As already stated, the motor 17 may alternatively be a D.C. motor. A timing disc can then be disposed on the D.C. motor shaft for accurate positioning, a number of markings on said disc being scanned by opto-electronic elements. In that case the pulse generator 22 delivers signals to the motor control unit 21 until a predetermined number of timing pulses has been scanned corresponding to the difference between the required-position and the actual-position.

The control unit 26 also serves to control the position of the auxiliary read head 6 so that it always follows the reference track 5 (or 8). To this end, the control unit 26 contains a control circuit which always controls the motor 17 so that the auxiliary read head 6 always accurately follows the edge of the reference track 5 or 8.

As already stated, at the start of operation of the magnetic tape device, the magnetic head 1 is brought into a reference position associated, for example, with the edge of the magnetic tape 2. In this reference position, the reference track 5 is recorded on the magnetic tape 2 as described in connection with FIG. 1.

To record the first track with data signals on the magnetic tape 2, the magnetic head 1 is then positioned to the required track, after a rewind operation if necessary. Positioning takes place in such a manner that the auxiliary read head 6 comes to lie approximately on that edge of the reference track 5 which is remote from the edge of the magnetic tape 2. For subsequent fine positioning, the magnetic head 1 is so controlled that the auxiliary read head 6 follows the edge of the reference track 5 as accurately as possible during the movement of the magnetic tape 2. At the same time, write signals S1 associated with the data signals are fed to the write head 3 via a write amplifier 28. For fine positioning, read signals delivered by the auxiliary read head 6 are fed as signals S2 to the control unit 26 via a read amplifier 29. Control unit 26 compares the signals S2 with a threshold value and so controls the motor 17, using the said control circuit, that it always follows the edge of the reference track 5. In this way, high accuracy of positioning is achieved so that the track density can be increased.

To write the other tracks, the next adjacent track is then used as the reference track 8 as described in connection with FIG. 2. Again the control unit 26 controls the position of the magnetic head 1 by the auxiliary read head 6 following the edge of the reference track as accurately as possible.

The procedure for reading data from the magnetic tape 2 corresponds to the procedure for writing. Again the magnetic head 1 is first roughly positioned in known manner to the specific track and then finely positioned using the auxiliary read head 6. In this case the read head 4 delivers read signals which are fed for evaluation to the control unit 26 as signals S3 via a read amplifier 30.

If no means is provided to detect the edge of the magnetic tape 2, the first track is conventionally recorded with data signals during the recording thereof and is then used as a reference track 8 for the recording of other tracks. The following tracks are then recorded by using in each case a different previously recorded track with data signals as the reference track 8. The same applies to the reading of the data signals. If only one track has been recorded on the magnetic tape 2, only one reference track 5 is required, otherwise a different track, preferably the last track read, is used as a new reference track 8 in each case.

The above-described exemplified embodiment, which is based on a magnetic head structure according to FIG. 1 or 2, enables the individual data tracks 8 and 9 to be packed relatively densely on the magnetic tape 2. This means that a relatively high track density can be used for recording. Nevertheless, as shown by reference numeral 7, edge strips are also provided between the individual data tracks 8 and 9 and are intended more particularly to obviate signal interference from adjacent tracks. Although these edge strips can be kept narrow in the present case, they are nevertheless unusable areas for data recording and together constitute an appreciable proportion of the area of the magnetic tape 2.

This area loss can be largely eliminated by using a recording process known from audio and video technology. This process is known as the azimuth recording process and can be adapted for use even in recording data in tracks extending parallel to the longitudinal direction of the magnetic tape 2.

Figure 4:
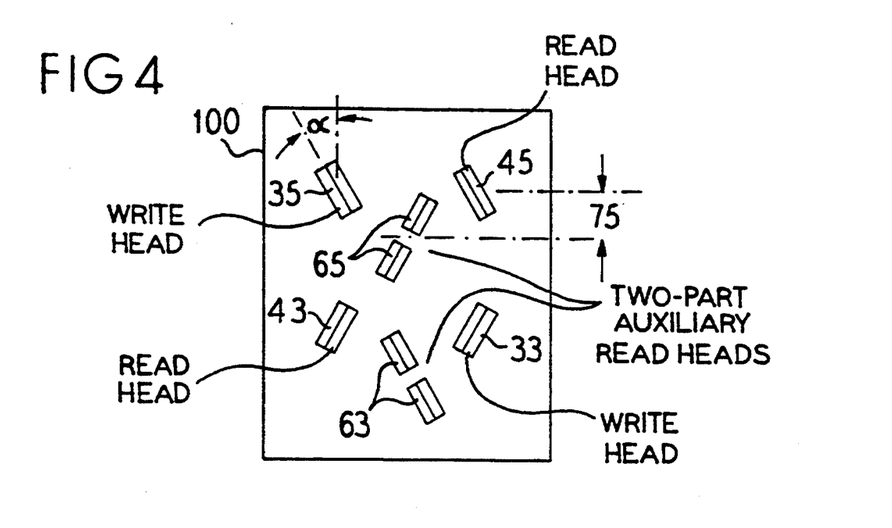
FIG. 4 illustrates another embodiment of a magnetic head in accordance with the principles of the present invention, with two magnetic systems each consisting of a write head, a read head and an auxiliary read head, the air gaps of these magnetic systems having different azimuth angles.

FIG. 4 illustrates an embodiment for a two-channel magnetic head 100, the magnetic head systems of which each consist of a write head 33 (or 35) and a read head 43 (or 45) and additionally each have a two-part auxiliary head 63 (or 65). The air gaps of all these sub-heads are set positively or negatively by a predetermined angle, the azimuth angle $\alpha$, relative to the vertical with respect to the longitudinal direction of the magnetic tape. The basic feature is that the data recording is effected alternately with different azimuth angles in the vertically consecutive tracks. The read and write heads 33 and 43 and 35 and 45 of a magnetic head system therefore have the same azimuth angle with respect to magnitude and direction, e.g., $+\alpha$, while the respective associated auxiliary heads 63 and 65 have opposite azimuth angles $-\alpha$.

In addition, each auxiliary head is vertically offset by one track pitch 75 relatively to the associated read and write head of the corresponding magnetic system.

Figure 5A:
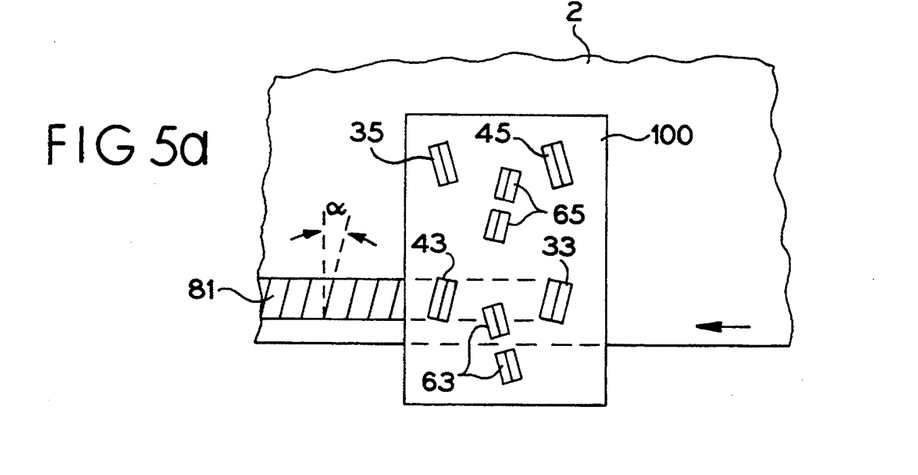
FIGS. 5a to 5c show serial recording operations in accordance with the principles of the present invention, in consecutive recording tracks using a magnetic head according to FIG. 4.
Figure 5B:
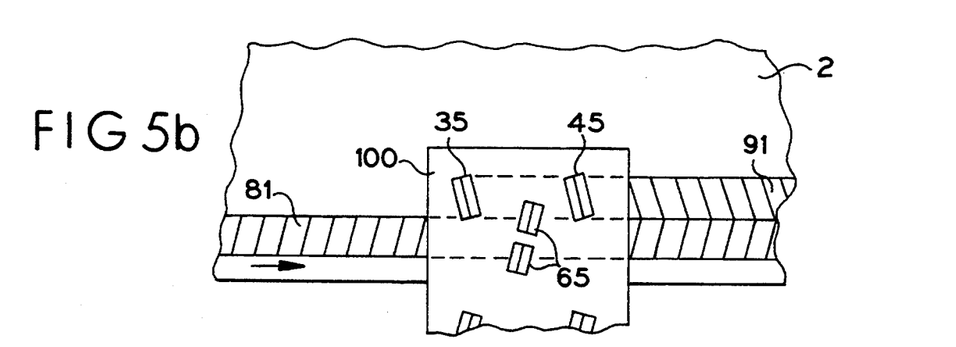
Figure 5C:
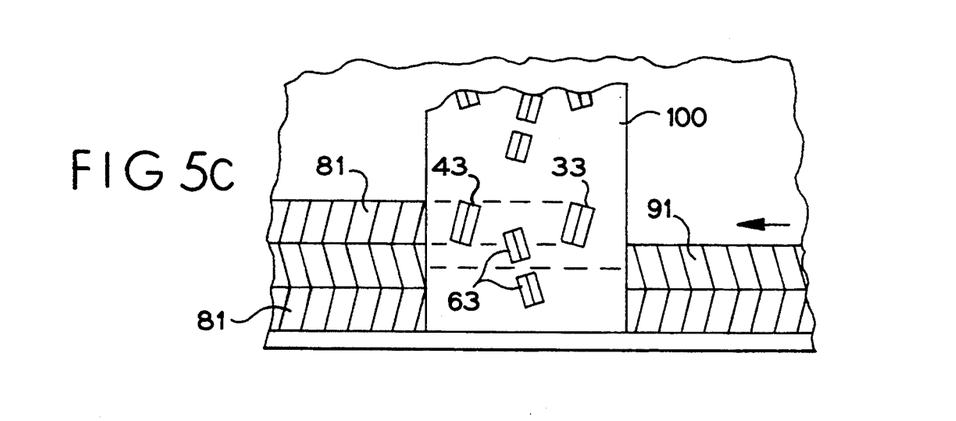

FIGS. 5a to 5c diagrammatically show how the data recording can be effected with a magnetic head 100 of this kind in recording tracks 81 and 91 extending in parallel side by side. The relative movement of the magnetic tape 2 with respect to the magnetic head 100 is indicated by an arrow $v$. FIG. 5a shows that, preferably, a first recording track 81 is recorded near the edge, for example by means of the write head 33. The positioning of the magnetic head 100 in these conditions can be effected by one of the above-described methods, the respective auxiliary heads 63 and 65 of the magnetic head 100 preferably remaining out of operation during the writing of this first recording track 81. As illustrated diagrammatically, the changes in the magnetization in this recording track—which are systematically preset due to the structure of the magnetic head 100—are also aligned at the azimuth angle $+\alpha$ relative to the vertical with respect to the longitudinal direction of the magnetic tape 2.

FIG. 5b now shows the position and function of the magnetic head 100 in the recording of an adjacent recording track 91 using the second magnetic head system having head 35, 45, and 65. The auxiliary head 65 of this system is positioned and held with its two differential air gaps symmetrical to the center of the already recorded track 81. This is effected in known manner by re-positioning the magnetic head 100 until the difference signal from the two read signal components of the auxiliary head 65 is zero. In that case the auxiliary head 65 is centered relatively to the center of the recording track 81.

In the case of a high track density and possible vertical movements of the magnetic tape 2, which can already be clearly detected relatively to the track width, it is advantageous to conduct this fine positioning of the magnetic head 100 continuously during the recording operation for the recording track 91. The relative position of the magnetic head 100 in relation to the first recording track 81, now serving as the reference track, is thus kept constant. Since, according to the structure described for the magnetic head 100, the vertical distance between the write head and the respective auxiliary head 35 or 65 corresponds to the track pitch 75 (which in this case is exactly equal to the track width), the second recording track 91 is placed directly beside the instantaneous reference track 81.

FIG. 5c shows how the subsequent third recording track, again of the same type as the recording tracks 81, is recorded similarly. For this purpose, the first magnetic head system having heads 33, 43 and 63 is again used. As in the above description, the auxiliary head 63 thereof is centered relatively to the center of the recorded adjacent track of the same type as tracks 91. Thus the write head 33 records the third track immediately adjacent. To record other tracks, these operations continue in the manner described, the two magnetic head systems, respectively having head systems 33, 43, and 63 and heads 35, 45, and 65, being alternately used for recording and similarly for reading the data information.

Figure 6:
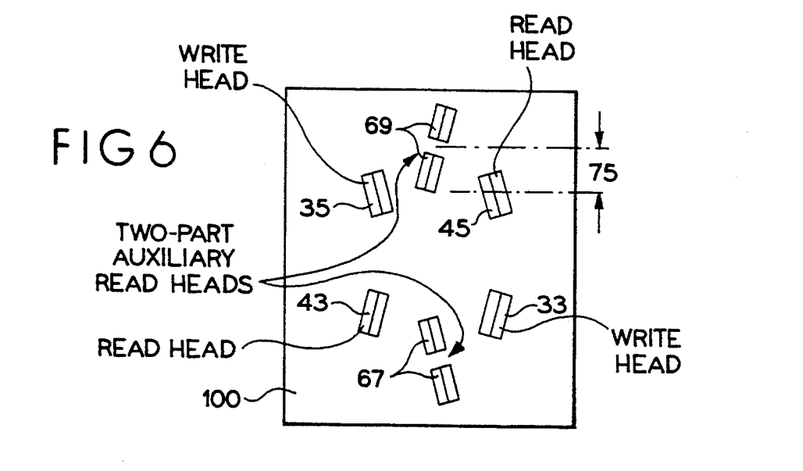
FIG. 6 shows another embodiment of a multi-track head in accordance with the principles of the present invention, with different azimuth angles for the air gaps of the individual magnetic heads.

FIG. 6 shows another embodiment for a magnetic head 100 which is also of two-channel construction. Unlike the magnetic head described with reference to FIG. 4, auxiliary heads 67 and 69 are in this case offset outwardly by one track pitch 75 in each case relative to the associated write and read heads 33 and 35, and 43 and 45 respectively.

As shown in FIGS. 7a to 7d, this embodiment is particularly suitable for recording the individual tracks 81 and 91 side-by-side in the direction of the tape edges, starting from the tape center shown in dot and dash lines. The instantaneous relatively movement $v$ of the magnetic tape 2 with respect to the magnetic head 100 is again shown by an arrow. As described in connection with FIG. 3, the tape center can be determined by locating the tape edges by magnetic/inductive or optical processes. The first recording track, e.g., in the form of a recording track 81, can be recorded either directly centered relative to the tape center or, as in the embodiment shown in FIG. 7a, closely adjacent this tape center. In these circumstances the auxiliary head 67 associated with the recording magnetic system, e.g., 33, 43 and 67, is inoperative.

Figure 7A:
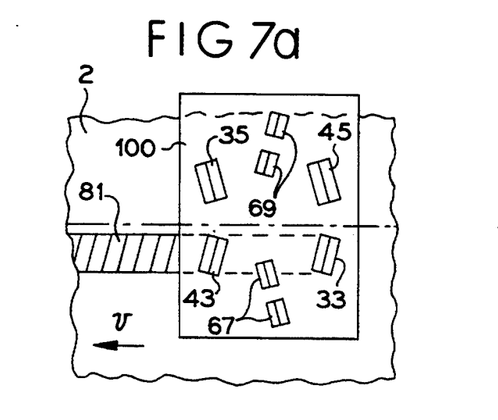
FIGS. 7a to 7d diagrammatically illustrate serial recording processes in accordance with the principles of the present invention, using a magnetic head of the kind shown in FIG. 6.
Figure 7B:
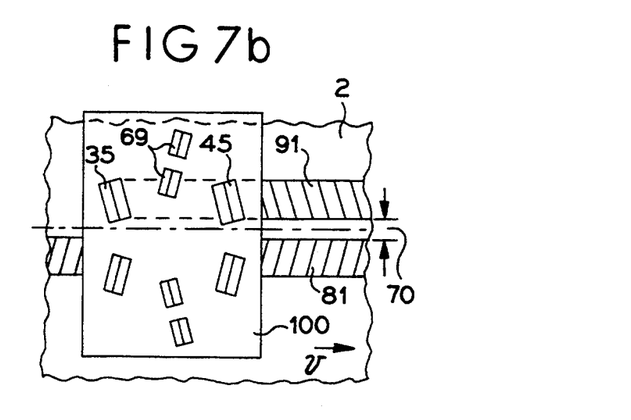

FIG. 7b shows a possibility of recording the second recording track 91, which in this case is disposed parallel to the first track 81 but on the other side of the tape center. If this track is recorded without utilizing the servo-function of the auxiliary heads, the two tracks 81 and 91, disposed symmetrically to the tape center, preferably have a defined edge spacing 70 from one another to avoid signal interference. The reason for this step is that first tracks 81 and 91 recorded without servo-information are thus present and are each recorded in one of the directions of the tape transport.

The unwanted vertical movements of the magnetic tape 2 have a relatively high repetition rate in each direction of transport of the tape 2. The advantage of recording other information tracks using the associated first recording track 81 and 91 as reference track, is that the continuous fine positioning of the magnetic head 100 is required to compensate for only slight off-positions of the track.

Figure 7C:
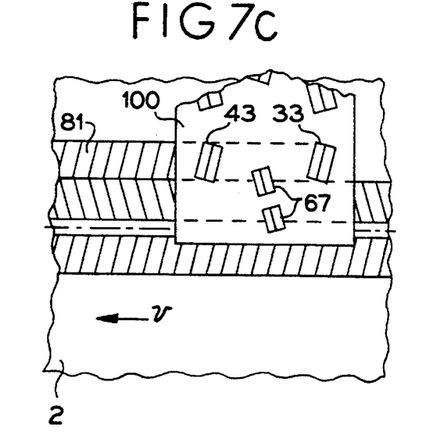
Figure 7D:
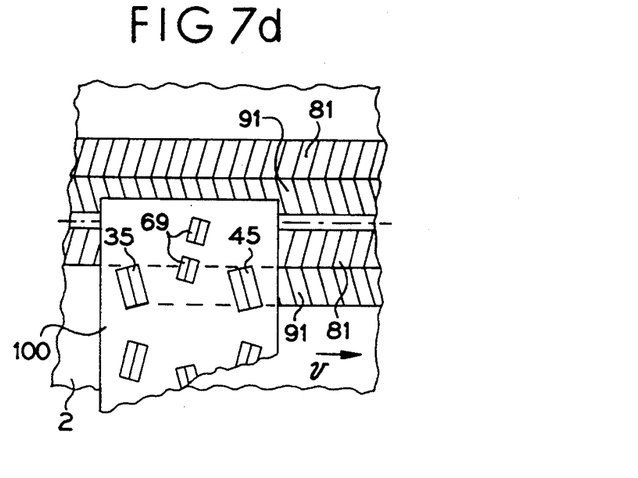

The other two FIGS. 7c and 7d show how the next two recording tracks 81 and 91 are recorded. During recording of these tracks, the track-holding function of the associated auxiliary heads 67 and 69 is utilized. By reason of their divided air gaps—as already explained above—the auxiliary heads 67 and 69 are centered over each adjacent and previously recorded track and are kept, preferably continuously, in this position relative to the magnetic tape 2. Thus the positioning of the magnetic head 100 follows all the vertical movements of the magnetic tape 2, so that the associated track can be laterally added directly to the adjacent inner recording track 81 or 91.

The structure of the above embodiments is well-suited for the data recording. In both the magnetic head systems described the write heads 33 and 35 and the read heads 43 and 45 are disposed successively in the direction of tape movement, and this allows monitoring during recording operations in both directions of tape transport.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for positioning a magnetic tape head in a direction of movement perpendicular to a direction of movement of a magnetic recording medium for serial information recording in a plurality of parallel tracks on said magnetic recording medium, said magnetic recording medium having a longitudinal axis and said magnetic tape head having a read head and a write head, and an auxiliary read head disposed a predetermined distance from one of said read or write heads in said direction perpendicular to said direction of movement of said magnetic recording medium, said method comprising the steps of:
   (a) recording a first track on said magnetic recording medium with said write head at a predetermined distance from said longitudinal axis of said magnetic recording medium, said first track thereby serving as an immediately preceding recorded track;
   (b) positioning said auxiliary read head over said immediately preceding recorded track;
   (c) recording a further track on said magnetic recording medium with said write head using said immediately preceding recorded track as a reference track by maintaining said auxiliary read head over said immediately preceding recorded track during recording of said further track so that said auxiliary read head follows said immediately preceding recorded track; and
   (d) recording additional further recording tracks on said magnetic recording medium with said write head by repeating steps (b) and (c) by recording each additional further track using the track preceding the additional further track as said reference track.

2. A method as claimed in claim 1 comprising the additional steps of:
   for each recorded track, recording changes in magnetization in directly contiguous relationship at an azimuth angle relative to said longitudinal axis of said magnetic recording medium; and
   alternating said azimuth angle between a positive angle and a negative angle for recording adjacent tracks.

3. A method as claimed in claim 1 wherein said auxiliary read head has a two-part air gap, and comprising the additional step of:
   centering said auxiliary read head relative to a center of said reference track by scanning opposite edges of said reference track with said two-part air gap auxiliary read head.

4. A method as claimed in claim 1 wherein said magnetic tape head further includes a further read head and a further write head, said write and read heads and said further write and read heads being respectively aligned parallel to said direction of movement of said magnetic recording medium, and said method comprising the additional step of:
   recording successive tracks on said magnetic recording medium with said direction of movement of said magnetic recording medium alternating in opposite directions.

5. An apparatus for positioning a magnetic tape head in a direction perpendicular to the direction of movement of a magnetic recording medium for serially recording information in a plurality of parallel tracks on said magnetic recording medium, said magnetic recording medium having a longitudinal axis, said apparatus comprising:
   a magnetic tape head having a read head and a write head, and an auxiliary read head disposed in a predetermined distance from one of said read or write heads in said direction perpendicular to said direction of movement of said magnetic recording medium; and control means for positioning said auxiliary read head over an immediately preceding recorded track on said magnetic recording medium during recording of a further track on said magnetic recording medium and for maintaining said auxiliary read head over said immediately preceding recorded track during recording of said further track so that said auxiliary read head follows said immediately preceding recorded track during recording of said further track.

6. An apparatus as claimed in claim 5 wherein said control means includes means for scanning one edge of said immediately preceding recorded track during recording of said further track using said auxiliary read head.

7. An apparatus as claimed in claim 5 wherein said auxiliary read head has a width which is less than a width of said read head in said direction perpendicular to said direction of movement of said magnetic recording medium.

8. An apparatus as claimed in claim 5 wherein said magnetic tape head has two of said auxiliary read heads, and wherein said control means includes means for scanning opposite edges of said immediately preceding recorded track during recording of said further track using said two auxiliary read heads.

9. An apparatus as claimed in claim 5 wherein said magnetic tape head has a plurality of said write heads, a plurality of said read heads, and a plurality of said auxiliary read heads.

10. An apparatus as claimed in claim 9 wherein said magnetic tape head has at least two magnetic systems, each magnetic system having a write head, a read head and an auxiliary read head, with the write and read heads in each magnetic system being disposed side-by-side in a direction parallel to said direction of movement of said magnetic recording medium, and the respective auxiliary read heads in said magnetic systems being disposed centrally between the write and read heads in each magnetic system.

11. An apparatus as claimed in claim 10 wherein each of said write heads, said read heads, and said auxiliary read heads has an air gap, with the respective air gaps of the write and read heads in one of said magnetic systems being disposed at a positive azimuth angle relative to said longitudinal axis of said magnetic recording medium and the air gap of the auxiliary read head in said one magnetic system being disposed at a negative azimuth angle, equal in magnitude to said positive azimuth angle, and wherein the write and read heads of the other magnetic system are disposed at said negative azimuth angle and the auxiliary read head of said other magnetic system is disposed at said positive azimuth angle.

12. An apparatus as claimed in claim 11 wherein said auxiliary read heads are offset in said direction perpendicular to the direction of movement of said magnetic recording medium by one track pitch relative to the write and read heads of the magnetic system containing the auxiliary read head.

13. A method as claimed in claim 1 comprising the additional step of:
   mounting said read head and said write head and said auxiliary head on a common head carrier, with said auxiliary head disposed a fixed distance from said write head and said read head.

* * * * *